Figures 5, 7:
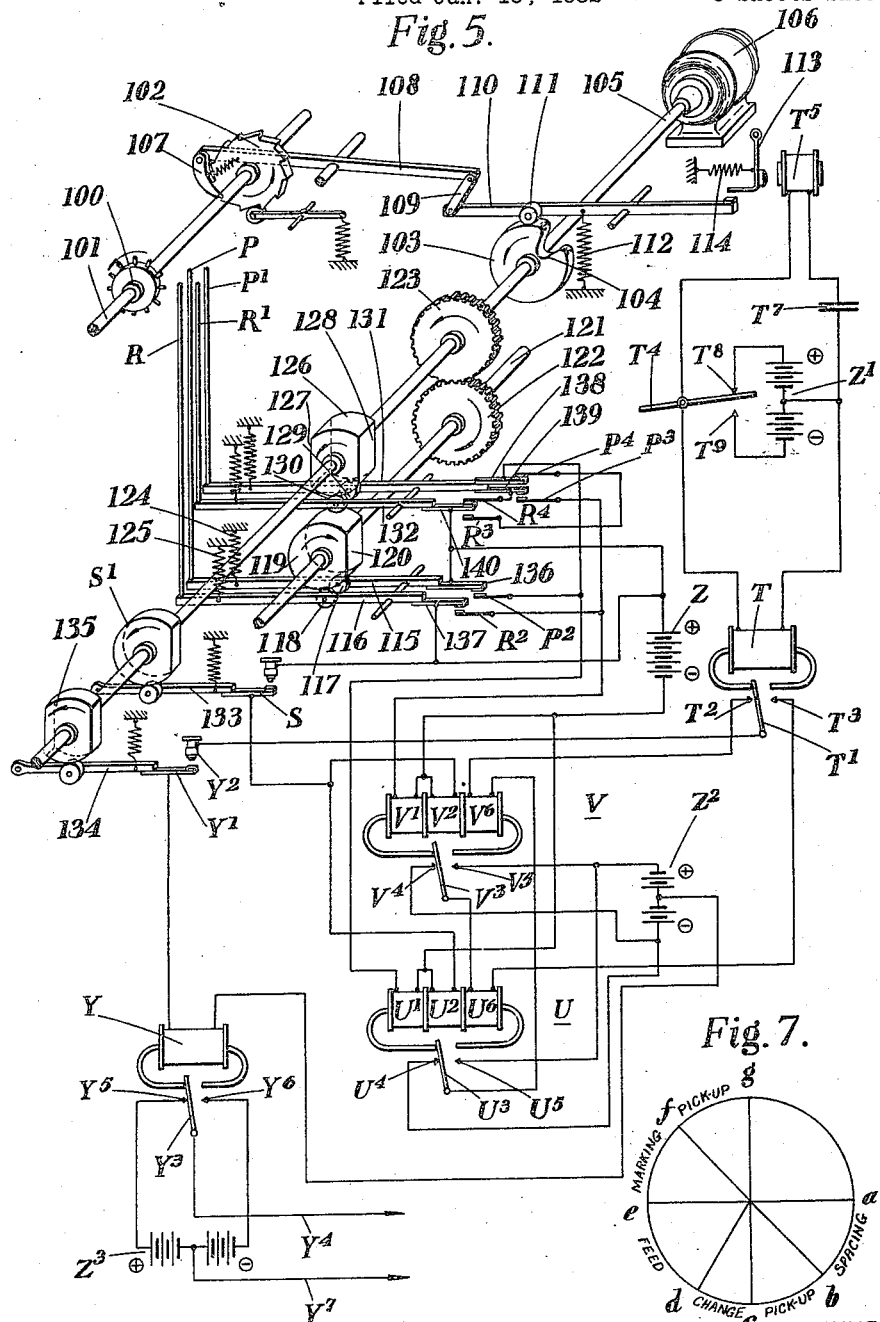

March 7, 1933.  J. H. SMART  1,900,772
AUTOMATIC SECRET TELEGRAPH SYSTEM
Filed Jan. 15, 1932   3 Sheets-Sheet 1
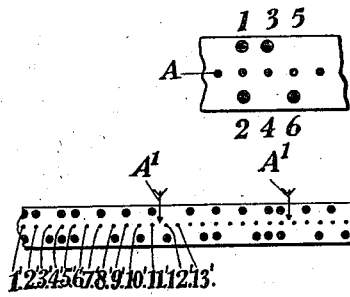
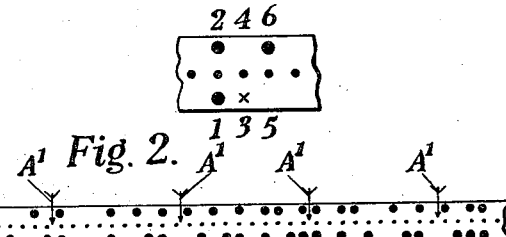
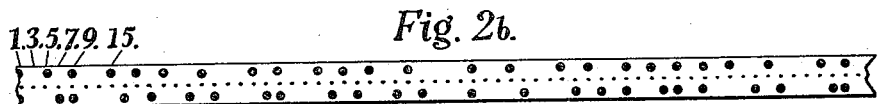
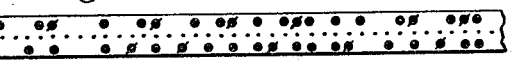
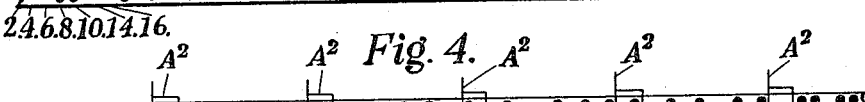
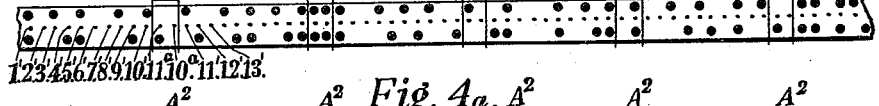
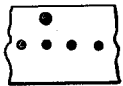 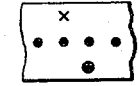  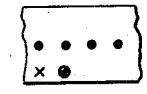
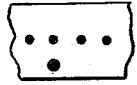 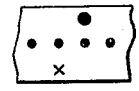 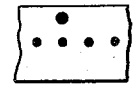 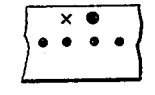
INVENTOR
J. H. SMART
BY
ATTORNEYS

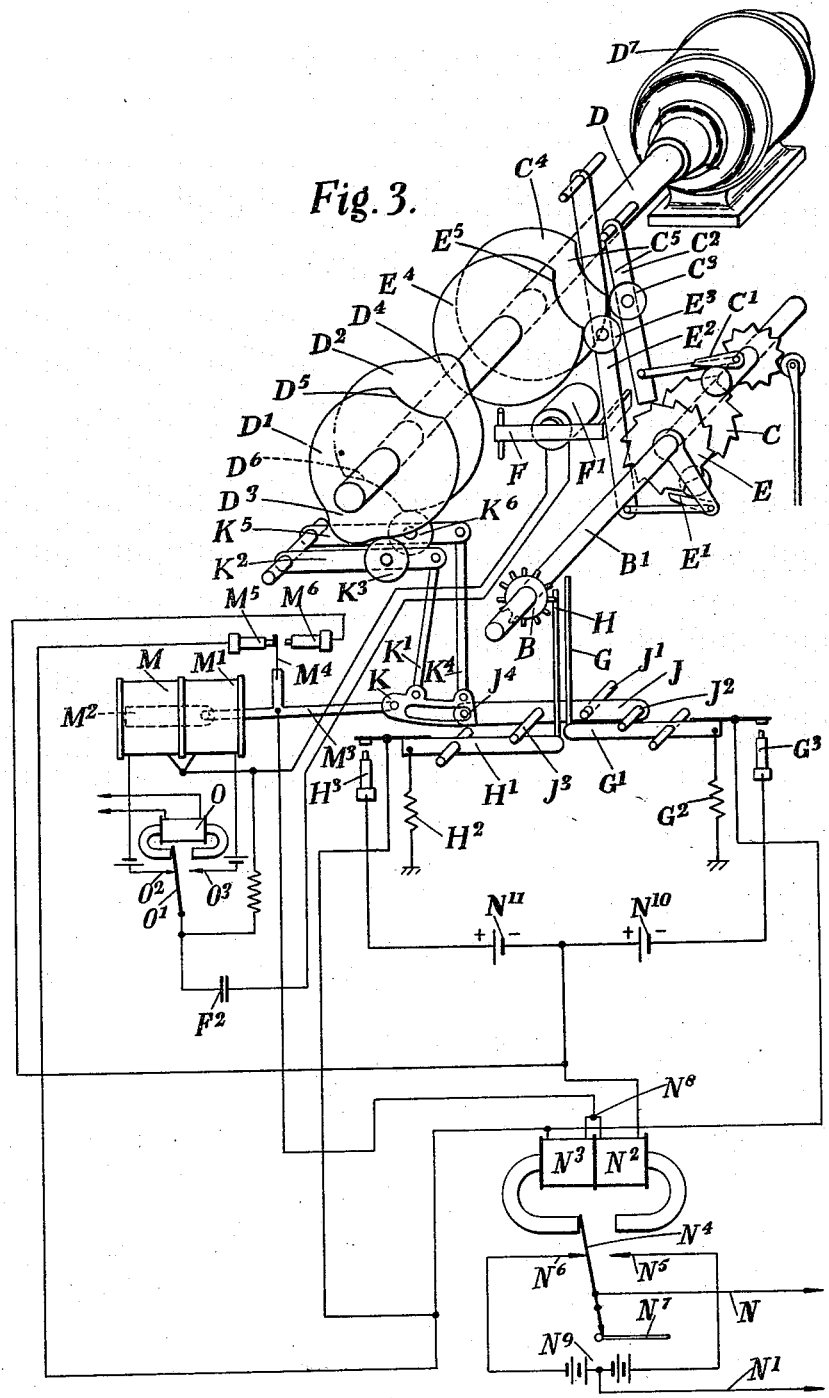

March 7, 1933. J. H. SMART 1,900,772
AUTOMATIC SECRET TELEGRAPH SYSTEM
Filed Jan. 15, 1932  3 Sheets-Sheet 3

INVENTOR
J. H. SMART
BY
ATTORNEYS

Patented Mar. 7, 1933

1,900,772

UNITED STATES PATENT OFFICE

JAMES HENRY SMART, OF SHANGHAI, CHINA

AUTOMATIC SECRET TELEGRAPH SYSTEM

Application filed January 15, 1932, Serial No. 586,766, and in Great Britain February 4, 1931.

This invention relates to automatic telegraph systems of the perforated tape type having signal holes arranged in two or more rows on the tape, and although not limited thereto is more particularly concerned with perforated tape systems of the well known Wheatstone type employing the Morse code.

It is desirable that the signals transmitted by such systems, whether over line wires or by wireless, should be rendered unintelligible to any unauthorized person intercepting them, and the object of the present invention is to provide an improved system in which transmitted signals are so mutilated as to become substantially indecipherable and yet can be simply and automatically translated at the receiving end.

Another object of this invention is to render the transmitted impulses substantially indecipherable by means at the transmitting end adapted to effect an operation which is equivalent to physically turning over or reversing the tape at predetermined intervals. Throughout the specification the perforated tape is referred to as "straight" when it is the right way up and "reversed" when it has been actually or in effect turned over so that (for example with a Wheatstone type tape) the signal holes which are normally above the center holes are below the center holes.

Preferably a perforated tape bearing the message is fed into the transmitter which is so operated at predetermined intervals during the transmission that the signals transmitted are equivalent to those which would be transmitted if the tape were actually turned over or reversed at such intervals.

Yet another object of the invention is to provide a translator for the received mutilated message. Preferably a perforated tape bearing such mutilated message is passed through a translator which is operated at the same predetermined intervals as the transmitter to reverse the effect of the tape, and which controls the operation of a reperforator or other receiver which thus reproduces the original message.

Conveniently a stepping back device is embodied in the transmitter which operates after each reversal to cause a repetition of the signals immediately preceding such reversal in order to prevent loss or distortion of signals due to the reversal. A skipping device is then provided in the translator which operates during each reversal to render a length of the tape corresponding to the amount stepped back by the transmitter inoperative so as to eliminate repeated signals.

In a preferred arrangement the transmitter is provided with pecker rods adapted to engage signal holes in the tape and operated by one or other of two cams, the selection of the operating cam being controlled by a key device whereby the order in which the pecker rods operate at each center hole of the tape is reversed at predetermined intervals. The translator is provided with pecker rods and selector rods adapted to engage signal holes in the tape, the selector rods being arranged to interpolate or neutralize signals so as to compensate for the mutilation of the message at the transmitting end.

The following is a description by way of example of a preferred system according to the invention with reference to the accompanying drawings, in which Figures 1 and 1a show a short strip of perforated tape in its original form and as received when reversed at the transmitting end, Figures 2, 2a and 2b respectively show a perforated strip bearing a message, the same strip reversed and the perforated strip obtained at the receiving end when the strip of Figure 2 at the transmitting end is turned over or reversed before passing through the transmitter, Figure 3 illustrates diagrammatically a preferred arrangement of transmitter, Figure 4 shows a perforated strip as obtained at the receiving station for the message shown in Figure 2 when the transmission is periodically reversed, Figure 4a shows a perforated strip similar to that shown in Figure 4 but with the sequence of the reversal of the transmission altered, Figure 5 illustrates diagrammatically a preferred arrangement of translator, Figures 6–6g show short lengths of strip illustrating the various conditions to be dealt with by the translator at the receiving end, and Figure 7 is a timing diagram for the translator shown in Figure 5.

Since the invention depends for its operation on the mutual relationship between the positions of the signal holes or perforations in the tape for an automatic Wheatstone transmitter, these positions and the operation of the normal transmitter will first be considered and certain laws governing the relationships of the holes formulated.

In the short length of tape shown in Figure 1 the signal holes represent a dot followed by a dash, i. e. the letter "a", the hole numbered 1 with the hole 2 immediately below it being the dot and the holes 3 and 6 with blank spaces 4 and 5 respectively below and above them, the dash. The center holes are employed for positioning the tape and are normally engaged by a star wheel which is rotated to move the tape step by step through the transmitter.

As is well known the normal Wheatstone transmitter controls the signal impulses sent to line by means of two pecker rods, which reciprocate alternately, the "marking" pecker cooperating with the signal holes above the center holes so that it makes contact to send a "marking" current to line when its end passes through an upper or top hole, such as 1, and the "spacing" pecker cooperating with the signal holes below the center holes so that it makes contact to send a "spacing" current to line when its end passes through a lower or bottom hole such as 2. After the initiation of a marking current it is sent continuously until the spacing pecker rises through a signal hole to send a spacing current which again continues until the next time the marking pecker passes through a signal hole.

When the section of the tape shown in Figure 1 is passed through the transmitter it advances step by step from right to left as the star wheel engages successive center holes. The speed of movement of the tape depends upon the speed of the star wheel and, for convenience of description, the time interval between said successive stepping movements will be referred to as "one center hole". As soon as the tape is stepped to the position in which the holes 1 and 2 are above the peckers the marking pecker rises through hole 1 to cause a marking current to be sent to line. Half a center hole later, the spacing pecker rises through hole 2 to cause a spacing current to be sent to line thus completing the "dot". At the end of the second half center hole the star wheel moves to advance the tape one step, following which the marking pecker rises again and passing through hole 3 starts the marking current for the dash. This marking current continues for one and a half center holes, since there are spaces at 4 and 5, until the spacing pecker rises through hole 6 to complete the dash.

If now the tape be turned over, as shown in Figure 1a, the marking pecker will engage what would normally be the lower and the spacing pecker what would normally be the upper holes. Thus the marking pecker will rise in hole 2 followed by the spacing pecker in hole 1. The marking pecker will have no hole at the next center hole as there is a space at 4 and the spacing pecker, although it rises through hole 3 (indicated by a cross in Figure 1a) will not alter the line current as a spacing current is already being sent. At the next center hole the marking pecker will rise in hole 6 and the marking current will be sent which continues until the next spacing hole (not shown).

Thus when a perforating receiver is employed a hole corresponding to hole 3, that is the first hole of the dash, will be missing and this loss of signal holes will often occur when the tape is reversed and engaged by normal peckers.

Considering the straight tape shown in Figure 2, it will be seen that, when it is reversed (Figure 2a) and sent through the transmitter, the tape obtained from the receiver will be perforated in the manner shown in Figure 2b, the signal holes which are "lost" being those which are crossed in Figure 2a.

From an examination of Figures 2, 2a and 2b it will be apparent that each "lost" hole must consist either of the first part of a dash or of the second part of a dot and thus the loss of a complete dot or dash can never take place. It will also be apparent that with a reversed tape a top hole always forms the end of a signal and a bottom hole the beginning.

Thus analyzing the numbered holes in Figure 2b which, as stated above, is the form of the received tape when the tape bearing the original message is reversed before being passed through the transmitter:—

Holes 1 and 2 are complementary since they form the end and beginning of a dot.

Hole 5 is the end of a signal (top hole) but cannot be the end of a dot since there is no hole at 6. It must therefore be the end of a dash the beginning of which should be at 4. Hence there is a hole missing at 4.

Hole 8 is the beginning of a signal (bottom hole) but it cannot be the beginning of a dash since hole 9 is the complement of hole 10. Therefore hole 8 must be the beginning of a dot and there is a hole missing at 7.

Similarly, hole 15 cannot be the end of a dot since there is no hole at 16 and therefore it is the end of a dash and there is a hole missing at 14.

From the foregoing considerations it is possible to formulate rules for "translating" a received reversed tape by means of which all the missing holes can be identified.

These rules are:—

1. If a top hole has no bottom hole opposite to it then it must belong to a dash and consequently there should be a complementary bottom hole opposite to the preceding center hole (if there is not one already there), and 2. If a bottom hole is followed by a center hole which has both top and bottom holes or has no holes at all then it (the bottom hole) must belong to a dot and should have a complementary top hole opposite to it (if there is not one already there).

Thus if a tape is run through a transmitter in alternate short straight and reverse lengths there will be many missing signals and the received signals will be indecipherable unless the exact points at which the tape is turned over are known and the rules for filling in the gaps in the reversed lengths applied at the correct points.

It will be apparent that in a message the operation of changing-over or reversing may occur at the end of a dot or of a dash, in the middle of a dash or in a space, thus causing varying mutual relationships between the signal or part of a signal just completed and the next signal to be sent. As a result it sometimes happens that signals are lost during or as a result of the reversal which cannot be supplied by a translator based on the two rules given above. For example, referring again to Figures 1 and 1a, assume reversal takes place in the middle of a dash, that is after the spacing pecker has risen for space 4 but before the marking pecker rises for space 5. When reversal takes place there is a marking current flowing to line due to the marking pecker having risen in hole 3 (Figure 1) and there being a blank at 4 (Figure 1) which prevents the spacing pecker rising. Immediately following the reversal the marking pecker rises in hole 6 (Figure 1a) but, since a marking current is already being sent, the line current remains unchanged. Hence on the received tape the hole 6 (Figure 1a) which should be at the beginning of the reversed length is "lost". It will be appreciated that in order to prevent the loss or mutilation of signals at reversal it is necessary to arrange that immediately following reversal the line current is in the correct sense, i. e. is in the sense in which it would have been had the part of the tape before the actual reversal been itself reversed. Thus in the above example the line current at the beginning of the reversed length must be a spacing current in order that the marking pecker rising in hole 6 (Figure 1a) may be effective.

To ensure that whatever happens at reversal it will always be possible to supply the missing signals it is only necessary to step back the tape one center hole immediately following reversal so that the signal holes (if any) of the two center holes (the one stepped back and the one actually engaged prior to reversal) are reengaged at the beginning of the new length. The signals (if any) at these two center holes are thus repeated at the beginning of the reversed length and although they may be themselves mutilated it is immaterial, since they are correctly produced at the end of the old length. They serve however to ensure that the true beginning of the reversed length is correct and at the receiving end, the translator can be arranged to eliminate these repeated signals. Thus there is no risk of a false or missing signal at the beginning of a new length following a reversal.

In practice it is of course not possible to turn over the tape literally even at comparatively long intervals and thus according to this invention the transmitter is operated at predetermined intervals so that the signals transmitted are equivalent to those which would be transmitted if the strip were actually turned over at such intervals.

In the preferred form of transmitter the essential parts of which are illustrated diagrammatically in Figure 3, the supporting framework being omitted in order to simplify the figure, the tape (not shown) is advanced step by step by a star wheel B mounted on a shaft $B^1$. The shaft $B^1$ is stepped round in a counterclockwise direction to advance the tape by means of a ratchet wheel C which is periodically engaged by a pawl $C^1$. The pawl $C^1$ is operated by an arm $C^2$ pivoted at its upper end and carrying a roller $C^3$ which normally engages a cam $C^4$ mounted on a shaft D which is continuously rotated by an electric motor $D^7$ during transmission, the cam having a recessed portion $C^5$ arranged so that when the roller $C^3$ moves into it the pawl $C^1$ engages the ratchet wheel C to advance the shaft $B^1$ one step. The star wheel B is thus moved to advance the tape one center hole for each revolution of the shaft D. In order to step back the tape a second ratchet wheel E having a pawl $E^1$ is arranged so as to drive the shaft $B^1$ in a clockwise direction, the pawl $E^1$ being operated by an arm $E^2$ having a roller $E^3$ which engages a second cam $E^4$ also mounted on the shaft D. The cam $E^4$ has a recess $E^5$ arranged so that the pawl $E^1$ can be operated to step back the tape one center hole for each revolution of the shaft D.

The rotation of the shaft $B^1$ by one or other of the ratchet wheels C and E is controlled by a pivoted stop F which engages one or other of the arms $C^2$ and $E^2$ so as to hold the roller thereon clear of its cam thus permitting the other arm to control the stepping round of the shaft. The position of the stop F is regulated by an electromagnet $F^1$ which, when it is energized, moves the stop F into the position in which the lever $C^2$ is inoperative and lever $E^2$ operative. Normally the electromagnet $F^1$ is deenergized and the stop F is retained by a spring (not shown) in the position in which it engages arm $E^2$, arm $C^2$ being free to operate its cam, when the shaft D is rotated, so that the tape is fed forwards.

Pecker rods G and H are arranged below the tape in the usual way, each rod being carried on a pivoted lever ($G^1$ or $H^1$) having a spring ($G^2$ or $H^2$) tending to raise the rod and an arm which cooperates with a fixed contact ($G^3$ or $H^3$) arranged so that when the rod is free to rise and passes through a signal hole the arm engages the contact to complete an electric circuit. Movement of the rods G and H is controlled by a rocking beam J pivoted at $J^1$ and carrying pins $J^2$ and $J^3$ which engage the levers $G^1$ and $H^1$ respectively so as to permit the rods to rise in turn as the beam is rocked.

When a tape is straight as it passes through the transmitter the current impulses sent to line must be such that as soon as the tape is advanced a step the pecker rod G for the top hole (in the case, for example, of a dot) rises first and completes at the contact $G^3$ of its lever $G^1$ a circuit for a marking current to be sent to line and then the pecker rod H for the lower hole rises and reverses the current to cause a spacing current to be sent after which the star wheel B advances the tape one center hole.

In order to send impulses which are equivalent to turning over or reversing the tape without physically doing this it is necessary not only for the pecker rods to rise in the reverse order but also for the currents sent to line by each pecker rod to be reversed. Thus in the transmitter shown in Figure 3 the pecker rod G, which is normally the marking pecker and rises first to complete at its contact $G^3$ a circuit for a marking current to be sent to line, must, to obtain the effect of a reversed tape, rise after the pecker rod H and complete at its contact $G^3$ a circuit for a spacing current to be sent to line.

The order in which the pecker rods rise depends upon the relationship between the rocking of the beam J and the rotation of the star wheel B. Accordingly the beam is driven from the shaft D by one or other of two cams $D^1$ and $D^2$ provided with the raised portions $D^3$ and $D^4$ which, as will be more fully described, cause the beam to rock in a counterclockwise direction to permit pecker rod G to rise, and recessed portions $D^5$ and $D^6$ which cause the beam to rock in a clockwise direction to permit pecker rod H to rise. The cams are mounted on shaft D so that their raised and recessed portions are spaced 180° apart. Thus with the cams in the position shown in the figure, assuming the shaft D is rotating in a counterclockwise direction so that the cam $C^4$ has just advanced the tape one center hole, operation of the beam J by the cam $D^1$ would allow rod G to rise and then rod H while operation of the beam J by the cam $D^2$ would allow rod H to rise and then rod G. In each case both rods rise and fall before shaft D completes its revolution at the end of which roller $C^3$ on arm $C^2$ engages the recessed portion $C^5$ of cam $C^4$ and advances the tape another center hole.

Selection of cam $D^1$ or $D^2$ for rocking the beam J is obtained by a slotted link K connected at one end by a rod $K^1$ to a pivoted arm $K^2$ having a roller $K^3$ which engages the cam $D^1$, and at the other end by a rod $K^4$ to a pivoted arm $K^5$ having a roller $K^6$ which engages the cam $D^2$. A pin $J^4$ on the beam J engages in the slot of the link K and is maintained at one end or the other of the slot by a solenoid. The solenoid has coils M and $M^1$ for controlling the position of a plunger $M^2$ which is connected to the link K by a rod $M^3$, this rod carrying a contact member $M^4$ adapted to engage one or other of two fixed contacts $M^5$, $M^6$ according to the position of the link.

As shown in the figure, the link K is in the position for sending reversed signals, i. e. in which the pecker rod H rises before the pecker rod G, since the cam $D^1$ only causes the link K to reciprocate about pin $J^4$ while the cam $D^2$ causes the beam J to rock. Energization of coil $M^1$ of the solenoid moves the link K so that the pin $J^4$ is at the other end of the slot $K^1$. The cam $D^1$ then rocks the beam J while the cam $D^2$ merely reciprocates the link K so that straight signals can be sent.

As previously stated the electrical connections must be such that the current sent as a result of the rise of a pecker rod can be reversed. Accordingly the current sent to line and earth, indicated at N and $N^1$ respectively, is controlled by a sending relay having two coils $N^2$ and $N^3$ connected in opposition and a tongue $N^4$ which, when it engages its contact $N^5$, sends a positive or marking current from a battery $N^9$ to line and when it engages its contact $N^6$ sends a negative or spacing current from the battery $N^9$ to line. The tongue $N^4$ is provided with the usual jockey roller $N^7$ to prevent it remaining in an intermediate position when the relay is deenergized.

The common point $N^8$ of the coils $N^2$ and $N^3$ is connected to the contact member $M^4$ and the relay coils are arranged so that a current flowing through both coils in series has no effect while a current flowing through either coil towards the point $N^8$ causes the tongue to move to contact $N^6$ to send a spacing current to line and a current flowing through either coil in a direction away from point $N^8$ causes the tongue to move to contact $N^5$ to send a marking current.

Considering the operation of the transmitter when the link K is in the position shown in the figure:—Rotation of shaft D allows pecker rod H to rise and, assuming there is a signal hole, to complete a circuit at its contact $H^3$ so that a current flows from battery $N^{11}$ through relay coil $N^2$ in a direction away from $N^8$. Energization of coil $N^2$ in this direction causes the tongue $N^4$ to move to contact $N^5$ to send a marking current to line. Relay coil $N^3$ is ineffective since it is short-circuited by contacts $M^4$, $M^5$. When pecker rod G rises through a signal hole its contact $G^3$ completes a circuit for current to flow from battery $N^{10}$ through coil $N^2$ in a direction towards point $N^8$ so that the tongue $N^4$ returns to contact $N^6$ and a spacing current is sent to line.

It will be apparent that when the link K is moved to the other position not only is the order in which the peckers rise reversed, as above described, but also the sending relay coil $N^2$ is short-circuited at the contacts $M^4$, $M^6$ and the operating currents flow through the coil $N^3$ in such directions that when pecker rod G rises through a signal hole a marking current is sent to line and when pecker H rises a spacing current is sent to line.

Movement of the link K from right to left, i. e. to the position shown in the figure, thus effects an alteration in the currents sent by the transmitter in accordance with the perforations on the tape which is equivalent to physically reversing or turning over the tape in an ordinary transmitter at the point where the movement of the link takes place. The coils M and $M^1$ are controlled by a relay O having an armature $O^1$ which engages its contact $O^2$ to energize coil M for moving the link K into the "reverse" transmission position and its contact $O^3$ to energize coil $M^1$ for moving the link K into the "straight" transmission position. The relay O may be operated in any suitable way so as to reverse the transmission at predetermined intervals it only being necessary to have some form of "key" to such reversals which can be used at the receiving station in conjunction with a translator, as will be more fully described hereinafter, in order to restore the received mutilated message to its original form.

For example, the control device for the relay O may consist of an ordinary Wheatstone transmitter through which is run a tape having the top and bottom holes spaced at the predetermined intervals, a similar tape being provided at the receiving station. With this arrangement gearing is arranged between the transmitters and is timed so that the peckers of the control transmitter rise (and cause a change-over) immediately after the cam $D^1$ or the cam $D^2$ has raised the second pecker (H or G as the case may be) so as to allow as much time as possible for the change-over and stepping back operations. Alternatively, any suitable form of disc, wheel or chain with adjustable pins or links may be employed which may be set at predetermined intervals to actuate the armature $O^1$ mechanically or electro-mechanically.

As stated above it is necessary, in order to avoid loss of signals during change-over, to step back one centre hole and repeat the signals sent at the last two centre holes of each length at the beginning of the next length. This is done by the energization of elctromagnet $F^1$ in series with condenser $F^2$ during the movement of armature $O^1$ from one to the other of its contacts. Stop F is moved to disengage arm $E^2$ and engage arm $C^2$ so that cam $C^4$ operates ratchet wheel E to step back the star wheel B, and consequently the tape, one centre hole. As electromagnet $F^1$ is energized momentarily by the discharge through the condenser $F^2$ only one hole is stepped back and the forward feeding by cam $D^4$ is resumed, the peckers rising after the change-over to repeat the signals opposite to the stepped-back centre hole and the next centre hole which, it will be remembered, were the last ones engaged prior to the operation of the control relay.

Figure 4 shows a tape bearing the received mutilated message when the message of Figure 2, which represents the words London, England, is reversed after the eleventh centre hole from the beginning and thereafter at every tenth center hole, as indicated by the arrows $A^1$ in Figure 2, and the first length is sent reversed. The signals within the rectangles $A^2$ in Figure 4 indicate the extra signals received due to stepping back the transmission tape and must be eliminated by the translator at the receiving end. The perforated tape of Figure 4a shows the different effect obtained on the received tape when the message of Figure 2 is reversed at the same intervals as in Figure 4 but a "straight" length is sent first.

It is now necessary to consider the means at the remote end for receiving the message and for translating the mutilated message so that it is restored to its original form. The apparatus required at this end consists of an ordinary perforating receiver which may be of the Creed or any other suitable type and is connected to the line so that it receives the incoming mutilated message in the form shown in Figures 4 or 4a, a translator through which the tape bearing the mutilated message is passed, a key or key tape device which reverses the translator at the same intervals as the transmitter at the sending station is reversed, and a reperforator similar to the perforating receiver or any other suitable marking or printing receiver to which the corrected impulses from the translator can be supplied. Since perforating and marking receivers are well known it is only necessary to describe in detail the arrangement and operation of the translator and its reversing device, it being assumed that the tape bearing the mutilated message is fed into this and the corrected impulses are supplied to any suitable receiver or recorder.

Referring now to Figure 5 the essential parts of the translator are illustrated diagrammatically, the supporting framework, bearings and other parts of the structure being omitted in order to simplify this figure. The tape (not shown) is advanced step-by-step, by a star wheel 100, over two pecker rods P and R and two selector rods P¹ and R².

The star wheel 100 is keyed to a shaft 101 which carries a ratchet wheel 102 operated by mechanism controlled by a cam 103 on the main shaft 105 of the translator which is continuously driven by an electric motor 106 or in any other suitable manner, as by clockwork mechanism. The mechanism for operating the ratchet wheel 102 comprises a pawl 107 carried on one end of a pivoted lever 108, the other end of this lever being connected by a link 109 to one end of a second pivoted lever 110. This second lever carries a roller 111 which is held in engagement with the cam 103 by a spring 112. The cam 103 is provided with a recess 104 which is so dimensioned that when, during rotation of the shaft 105, the roller drops to the bottom of this recess the levers 110 and 108 are actuated to rotate the pawl in a clockwise direction so that it slips over three teeth on the ratchet wheel 102 and thus when the roller 111 moves out of the recess 104 the pawl is rotated in clockwise direction to advance the star wheel and consequently the tape three steps.

Normally, however, the roller 111 is prevented from moving to the bottom of the recess 104 in the cam 103 by a hinged stop 113 which is maintained in position by a spring 114. This stop is so positioned that the roller will drop sufficiently far into the recess 104 to move the pawl 107 over one tooth of the ratchet wheel 102 so that the tape is advanced one step for each revolution of the shaft. An electromagnet T⁵ is mounted adjacent the stop 113 so that when it is energized the stop is moved, against the action of the spring 114, clear of the end of the lever 110 so as to permit this lever to act as described above to advance the star wheel three steps when the roller 111 engages in the recess 104 in the cam 103. As will be more fully described hereinafter the electromagnet T⁵ is energized during reversal of the translator.

The pecker rods P and R are mounted on levers 115 and 116 pivoted so that they can rock independently of one another, these levers respectively carrying rollers 117 and 118 which engage a cam 119 mounted on a shaft 121 geared by pinions 122 and 123 to the main shaft 105 so that it rotates at the same speed as but in the opposite direction to this main shaft. The pecker rods P and R are mounted so that they engage in the signal holes (if any) opposite to the center hole the "signal" of which is being analyzed by the translator at any instant, and are reciprocated once during each revolution of the main shaft by the cam 119 which is provided with a flat surface 120, so that when the rollers 117 and 118 are opposite to this surface the levers 115 and 116 are free to be moved by their associated springs 124 and 125 respectively to raise the pecker rods P and R to cause their upper ends to engage in the signal holes (if any) in the tape.

The selector rods P¹ and R¹ are mounted so that they engage in the signal holes (if any) adjacent to those engaged by the pecker rods P, R and are reciprocated by a cam 126 which engages rollers 129 and 130 on pivoted levers 131 and 132 respectively carrying the rods P¹, R¹. The cam 126 is keyed to the main shaft and is provided with two flat surfaces 127 and 128 so that the selector rods P¹, R¹ are reciprocated twice for each revolution of the tape.

A common spacing lever 133 is pivoted so that it is operated once during each revolution of the shaft 105 by a spacing cam S¹ mounted on the shaft 105, the operation of lever 133 completing a circuit at its contact S. A pivoted pick-up lever 134 is mounted so that it is actuated by a cam 135 on the main shaft twice during each revolution of the shaft 105 to complete an electric circuit between the contact Y¹ carried by the lever 130 and a fixed contact Y². The circuits controlled by the spacing lever S and the pick-up lever 130 will be fully described hereinafter in the description of the operation of the translator.

The pecker rod levers 115 and 116 carry at their free ends contact arms 136 and 137 which cooperate respectively with fixed contacts P² and R². The fixed contacts are mounted so that normally they do not engage the arms but a circuit is completed between the arm and its cooperating contact when the pecker rod reciprocated by the lever carrying the arm passes through a signal hole in the tape. The selector rod lever 131 carries two contact arms 138 and 139 insulated from one another, the arm 138 normally engaging a fixed contact P⁴ but disengaging this contact when the selector rod P¹ engages in a signal hole and the arm 139 being normally disengaged but engaging a fixed contact P³ when the pecker rod P¹ engages in a signal hole. The selector rod lever 132 carries a contact arm 140 which normally engages a fixed contact R⁴ but disengages this contact and engages a fixed contact R³ when the selector rod R¹ engages in a signal hole.

The various cams controlling the advance of the tape, the operation of the pecker and selector rods and the actuation of the spacing and pick-up levers are so dimensioned and arranged with respect to the main shaft 105 that when this shaft is rotated in a counterclockwise direction to drive the translator the operating cycle is as follows:—Cam 103 operates the ratchet mechanism to advance the tape one step, cams 119 and 126 release the pecker and selector rods P, R, and P¹, R¹ so that they are free to rise simultaneously to engage signal holes in the tape (if any), cam 135 operates to close the circuit controlled by the pick-up lever 134, cam 135 operates pick-up lever to open its contacts and then cams 119 and 126 simultaneously lower pecker and selector rods. This completes the first half of the cycle. In the second half of the cycle cams 126 and S¹ operate simultaneously respectively to permit the selector rods P¹, R¹ to pass through signal holes in the tape (if any) and to close the circuit controlled by the spacing lever 133, cam 135 operates to close the circuit controlled by the pick-up lever 134, cam 135 operates pick-up lever to open its contacts and then cams 126 and S¹ simultaneously lower selector rods P¹, R¹ and operate spacing lever to open its contacts. This completes the cycle and the tape is then advanced another step.

During the operation of the translator a marking current is obtained when a pecker rod or a selector rod passes through an appropriate signal hole during the first half cycle when these rods rise simultaneously, the pecker rod P and selector rod R¹ only being operative when the translator is set for a straight tape and the pecker rod R and selector rod P¹ only being operative when the translator is set for a reverse tape as will be more fully described hereinafter, the selector rods acting to interpolate a marking current when there is a marking hole missing in the tape. As the spacing lever 133 is always operated during the second half cycle spacing is obtained at each centre hole independently of the signal holes in the tape. Since, however, a spacing current is not required at every centre hole, the selector rods, when they rise a second time simultaneously with the operation of the spacing lever act to effect neutralization of the spacing current if there is an appropriate signal in the tape.

Selection for a straight or reversed tape is controlled by a relay T energized from a battery Z¹ and having a tongue T¹ which engages its contact T² for a "straight" tape and its contact T³ for a "reversed" tape. The position of relay T is controlled by a key switch T⁴ which is operated to effect reversal at the same intervals as the transmitter reverses, preferably by means identical to those employed for controlling the reversal of the transmitter.

As previously stated the transmitter steps back one center hole following reversal in order to prevent the complete loss of a signal, such as might occur, if reversal took place in the middle of, say, a dash. Since this stepping back merely ensures that in the received tape the first signal hole or holes at the true beginning of the new length following reversal are correct and are not "lost" or "added to" by reason of the reversal it is necessary for the translator to be provided with means for skipping the extra holes in the tape due to the stepping back of the transmitter, such means being operative to cause skipping of the last center hole before change-over and the first center hole after change-over.

Such means comprises the electromagnet T⁵ which, as described above, when energized moves the stop 113 clear of the end of the lever 110 so that the tape is moved three steps. The electromagnet T⁵ is arranged to be energized through a condenser T⁷ during movement of switch T⁴ from one to the other of its contacts T⁸ T⁹, whereby the tape moves forward three center holes during change-over so as to skip the two extra center holes therein due to the stepping back of the transmitter.

The pecker rods P, R and selector rods P¹, R¹ control through their contacts P², P³, P⁴ and R², R³, R⁴ the operation of straight and reverse storing relays U and V which in turn control a recording or translating relay Y, this relay either acting to record directly the corrected message or to transmit corrected impulses to a reperforator or other recording receiver (not shown). The translating relay Y is provided with a tongue Y³ connected to the line Y⁴ and two contacts Y⁵ and Y⁶ respectively connected to the positive and negative sides of a battery Z³ having its midpoint connected to the other line Y⁷. Thus when the relay tongue Y³ engages contact Y⁵ a positive or marking current is sent to line while when the tongue engages the contact Y⁶ a negative or spacing current is sent to line. The reperforator or other recording receiver is connected to the lines Y⁴, Y⁷.

Each storing relay (U or V) is provided with differentially wound marking and spacing coils (U¹, U² or V¹, V²) supplied from a battery Z through the contacts controlled by the pecker and selector rods, so that the current passes through the appropriate coil, and the tongue (U³ or V³) is moved from one to the other of its contacts (U⁴, U⁵ or V⁴, V⁵). The translating relay Y is connected to the positive or negative terminal of a battery Z² so as to record a marking or spacing current, by one or other of the tongues U³, V³, as determined by the position of the tongue T¹ of control relay T.

In order to prevent "clipping" or reversing of signals during change-over, as would occur if the storing relays U and V were not both sending current of the same sense at the moment of change-over, the pick-up lever 134 having a contact arm Y¹ cooperating with a contact Y² is arranged with its contacts in series between the tongue T¹ and the relay Y. As described above the contact Y² is completed twice for each centre hole and is timed to take place once after the simultaneous rise of the pecker and selector rods and once after the closing of the spacing lever S, as indicated in the timing diagram shown in Figure 7. This arrangement acts as a pick-up to pass on to the translating relay Y signals of the correct length. In the timing diagram shown in Figure 7 the circle represents the time taken for a complete cycle of operations between each movement of the tape, the sectors into which the circle is divided indicating the relative times of the various operations. Thus $a$—$b$ is spacing, $b$—$c$ pick up, $c$—$d$ change, $d$—$e$ feed, $e$—$f$ marking and $f$—$g$ pick-up.

As a further safeguard against the clipping of signals each of the storing relays (U and V) is provided with an additional winding ($U^6$ and $V^6$) which is connected in series between the tongue of the other storing relay and the contact of the control relay T to which this tongue is connected. Thus a marking or spacing current due to the operation of the "working" storing relay passes through the additional winding of the "idle" storing relay, this winding being so arranged that the current causes the idle relay (V in Figure 5) to follow the movements of the working relay (U in Figure 5). Thus both relays will be in position to send current of the same sense to the translating relay whenever reversal is effected by the operation of relay T.

Two general rules governing the replacing of missing holes have already been formulated, but in order to understand the operation of the translator it is desirable to consider in somewhat greater detail the conditions to be met with in practice, it being assumed that the translator is provided with a device which ensures that the two extra center holes produced by stepping back the transmitter tape are automatically skipped. These conditions are shown for a straight tape in Figures 6—6c and for a reversed tape in Figures 6d—6g, Figure 6 showing normal marking, Figure 6a marking hole missing at $x$, Figure 6b normal spacing, Figure 6c spacing to be neutralized at $x$, Figure 6d normal reversed marking, Figure 6e reversed marking hole missing at $x$, Figure 6f normal reversed spacing and Figure 6g reversed spacing to be neutralized at $x$.

From a consideration of these figures it is apparent that the interpolation of marking and the neutralizing of spacing to be effected by the translator are:—

(1) In the case of marking—to provide a marking current at the centre hole before a spacing hole which has not a marking hole opposite it if there is not a marking hole at such centre hole as indicated in Figures 6a and 6c. This need will arise in the case of a straight tape when the change-over occurs in the middle of a dash and the spacing hole is in the first hole of a new length.

(2) In the case of spacing—to neutralize a spacing current which may exist if there is a spacing hole in the tape at the next centre hole without a marking hole opposite to it since, as such spacing hole belongs to a dash, the current before the pecker rod passes through the spacing hole should be a marking current. This is shown in Figures 6c and 6g.

Considering now the operation of the translator for the various conditions shown in Figures 6—6g:—

1. Straight tape—normal marking, Figure 6. Pecker rod P rising in the signal hole closes its contact $P^2$ and a circuit is completed from the positive side of battery Z, contact arm 136, contact $P^2$, and the marking coil $U^1$ of relay U to the negative side of battery Z. If there is a marking signal hole at the next centre hole through which selector rod $P^1$ rises this rod $P^1$ only completes a circuit for coil $V^1$ of relay V which, owing to the position of contact $T^1$ for a straight tape, is ineffective. Energization of coil $U^1$ causes tongue $U^3$ to engage its contact $U^4$ (as shown in Figure 5) and a marking current is transmitted to relay Y as soon as contacts $Y^1$ $Y^2$ close.

2. Straight tape—marking hole missing at $x$, Figure 6a. Pecker rod P cannot rise but selector rod $R^1$ will rise, in the spacing hole at the next centre hole, opening its contact $R^4$ and closing its contact $R^3$. A circuit is thus completed from the positive side of battery Z, contact arm 140, contact $R^3$, contact $P^4$, contact arm 138 and the coil $U^1$ to the negative side of the battery. The desired marking current is thus transmitted to relay Y despite the fact that the marking signal hole is missing.

3. Straight tape—normal spacing, Figure 6b. The contact made by spacing contact arm S will complete a circuit for spacing coil $U^2$ of relay U whether there is a signal hole or not. Pecker rod R passing through a hole during the first half of the cycle will complete a circuit for relay coil $V^1$ which as in (1) is ineffective.

4. Straight tape—spacing to be neutralized at $x$, Figure 6c. The selector rod $R^1$ rising the second time passes through the signal hole opposite the next centre hole to energize relay coil $U^1$ (as in (2) above), the energization of this coil neutralizing the energization of coil $U^2$ by the spacing contact arm S.

5. Reversed tape—normal marking, Figure 6d. Pecker rod R rising through the hole completes at its contact $R^2$ a circuit from the positive side of the battery Z, contact $R^2$, contact arm 137 and through the coil $V^1$ of relay V to the negative side of the battery. This causes tongue $V^3$ to move over to contact $V^4$ and, since tongue $T^1$ now engages contact $T^3$ (reversed tape), a marking current is transmitted to relay Y as soon as contacts $Y^1$ $Y^2$ close.

6. Reversed tape—marking hole missing at $x$, Figure 6e. Pecker rod R cannot rise but selector rod $P^1$ rises in the spacing hole at the next center hole and completes at its contact $P^3$ a circuit for coil $V^1$ so that a marking current is sent to relay Y.

7. Reversed tape—normal spacing, Figure 6f. The circuit of spacing coil $V^2$ of relay V is completed at spacing contact arm S as in (3) above.

8. Reversed tape—spacing to be neutralized at $x$, Figure 6g. The selector rod $P^1$ rises as in (6) above to effect the energization of coil $V^1$ which neutralizes coil $V^2$ energized by closing of the spacing lever.

It will thus be appreciated that since the translator interpolates marking currents and neutralizes spacing currents as and when required in accordance with the rules previously formulated the record made by relay Y or by a reperforator supplied by this relay will be a reproduction of the original message on the tape fed into the transmitter provided that the control switch $T^4$ is actuated to effect reversal at the same intervals and in the same sense as the control relay O at the transmitting end.

In order to explain the action of the translator in actuating its relay Y so that the reperforator will produce a tape which is a reproduction of the original tape fed into the transmitter the operation of the translator as a short length of the tape shown in Figure 4 is fed into it will now be described in detail. For convenience of description corresponding centre holes in the two tapes of Figures 4 and 2 have been given the same numerals, the extra holes in the received tape (Figure 4) due to the stepping back of the transmitter being given the suffix $a$. As previously stated the first section of the received tape (Figure 4) is reversed. Thus the relay T of the translator must be set with its tongue $T^1$ engaging its contact $T^3$ and this relay must be arranged to reverse the translator every ten centre holes, that is at the same intervals as the transmitter was reversed when sending the message.

Referring to the cycle of operations at each center hole as shown in Figure 7 and the eight conditions to be met by the translator as described with reference to Figures 6—6g the star wheel 100 advances the received tape (Figure 4) during feed period $d$—$e$ to the position in which the pecker rods P, R are opposite center hole 1'. During the marking period $e$—$f$ the pecker rods P, R and the selector rods $P^1$, $R^1$ are raised simultaneously the rods P, R passing through the holes opposite the center hole 1' and the selector rod contact arms remaining in engagement with their rest contacts $P^4$, $R^4$ since there are spaces opposite the center hole 2'. The rod R acts as in condition 5, to cause relay Y to send a marking current to line thus producing the first portion of the "dot" above center hole 1' in the reperforated tape (Figure 2) and the rod P is ineffective since with the translator set for reversed tape the tongue $T^1$ engages the contact $T^3$. During the spacing period $a$—$b$ the selector rods $P^1$, $R^1$ are again inoperative and the cam $S^1$ initiates the spacing current which is sent to line by the relay Y during the pick-up period $c$—$b$, as in conditions 7, thus completing the "dot" at center hole 1' on the reperforated tape (Figure 2).

During the marking period $e$—$f$ at the center hole 2' the pecker rods P, R cannot rise but the selector rod $P^1$ rises through the upper hole at center hole 2' thus causing a marking current to be sent to line, as in condition 6, and starting the "dash" at center hole 2' (Figure 2). During the spacing period the rise of the selector rod $P^1$ through the upper hole at the center hole 3' neutralizes the operation of the spacing cam $S^1$, as in the condition 8, so that the marking current to line continues.

At center hole 3' the pecker rod P and the selector rod $R^1$ respectively rise through the upper hole at center hole 3' and the lower hole at center hole 4' but are ineffective owing to the reverse setting of the translator. The marking current to line thus continues during pick-up period $f$—$g$. During the spacing period $a$—$b$ only the selector rod $R^1$ rises so that the spacing cam $S^1$ is effective (condition 7) to cause a spacing line current during period $b$—$c$ thus completing the dash by the lower hole at center hole 3' of the reperforated tape (Figure 2).

At center hole 4' during period $e$—$f$ the pecker rod R rises through the lower hole and the selector rods $P^1$ $R^1$ through the holes at center hole 5'. Thus a marking current is sent to line during period $f$—$g$. During period $a$—$b$ the spacing cam $S^1$ operates and is not neutralized by selector rod $P^1$ since the neutralizing circuit closed at contact $P^3$ of this rod is opened at back contact $R^4$ of selector rod $R^1$ which also rises. A spacing current is thus sent to line during period $b$—$c$ and completes the dot at center hole 4' (Figure 2).

At center hole 5' the operation is the same as that described above for center hole 1' and a dot is reproduced at this center hole (Figure 2).

At center hole 6' a space is reproduced since neither the pecker rods nor the selector rods have holes to pass through.

At center holes 7' and 8' the operations are the same as those described above for center holes 2' and 3' so that a dash is produced at these holes on the reperforated tape (Figure 2).

At center hole 9' during period e—f the pecker rod R and the selector rod P¹ rise thus causing a marking current to be sent to line during period f—g and beginning the "dash". During period a—b the operation of the spacing cam S¹ is neutralized by the selector rod P¹ rising a second time through the upper hole at centre hole 10' so that the marking current continues during period b—c.

At center hole 10' during period e—f the pecker rod P rises in the upper hole and the selector rod R¹ in the lower hole at center hole 11a the marking current thus continues during period f—g. During period a—b the spacing cam S operates and since the selector rod P¹ cannot rise at hole 9a a spacing current is sent to line during period b—c thus completing the dash at the lower hole of center hole 10' (Figure 2).

The reversing relay is then operated during periods c—d and d—e to move the tongue T to the contact T² and simultaneously the condenser T⁷ discharges through the relay T⁵ to operate the skipping device so that the holes 11a and 10a, that is the last center hole before change-over and the first center hole after change-over, produced on the tape (Figure 4) by the stepping back of the transmitter are omitted and the pecker rods P and R are in line with center hole 11'.

At center hole 11' during period e—f the pecker rod P rises in the upper hole and the selector rod R¹ in the lower hole at center hole 12'. The pecker rod P causes a marking current to be sent to line during period f—g as in condition 1, the selector rod R¹ merely acting to complete a circuit for causing this marking current in parallel with that completed by the pecker rod P (condition 2). The beginning of the "dash" at center hole 11' is thus produced on the reperforated tape (Figure 2). During period a—b the selector rod R¹ rising in the lower hole at center hole 12' neutralizes the operation of the spacing cam S as in condition 4, the marking current thus being continued during period b—c.

At center hole 12' during period e—f the pecker rod R rises in the lower hole and the selector rods do not rise since there are spaces at center hole 13'. The pecker rod R is ineffective so that the marking current continues during period f—g. During period a—b the spacing cam S¹ operates and, since it is not neutralized, a spacing current is sent to line which completes the "dash" at the lower hole of center hole 12' of the reperforated tape (Figure 2).

The further operation of the translator to send to the reperforator or other instrument corrected impulses corresponding to perforations on the original tape as shown in Figure 2 will readily be understood from the above detailed description in conjunction with the eight conditions defined above which control the operation of the translator.

By comparing Figure 2 with Figure 4 or Figure 4a it will be appreciated that it will be extremely difficult if not impossible to decipher a message mutilated in this way without a key to the points at which reversal takes place, and that, since the reversals can be arranged at any desired regular or irregular intervals and the key can be changed every few minutes, a very high degree of secrecy is obtained. Furthermore the small loss in speed due to the stepping back of the transmitter is more than compensated for by the introduction of false signals at the two extra center holes which are indistinguishable from the real message and assist in rendering the message transmitted indecipherable.

It is to be understood that the above description is by way of example only and that many modifications may be made in the transmitting and receiving apparatus within the scope of the invention as defined in the accompanying claims. For example instead of modifying the transmitter so that the reversing effect is obtained therein the perforator itself could be modified in the same way so that a tape is prepared bearing the mutilated message, this tape being fed into an ordinary transmitter and the key tape or the like controlling the reversals of the perforator being employed with the translator at the receiving end. It will be appreciated that in the case of wireless transmission the reversing transmitter can be employed to control or modulate a wireless transmitter in any suitable manner instead of supplying impulses directly to a line wire as in the arrangement described, the wireless receiver being arranged to operate a perforating receiver the tape from which is passed through the translator.

What I claim as my invention and desire to secure by Letters Patent is:—

1. In an automatic telegraph transmitter controlled by signal holes in a perforated tape passing through it, the combination of two pecker rods adapted respectively to engage in upper and lower signal holes in the perforated tape, means for reciprocating the rods alternately, means for reversing at predetermined intervals the order in which the two rods are reciprocated, a source of marking and spacing electric current, a transmitting relay associated with said source and so controlled by the pecker rods that it transmits a marking current when one pecker rod engages in a signal hole and a spacing current when the other pecker rod engages in a signal hole, and means whereby the pecker rods which respectively control the marking and spacing current transmissions of the relay are reversed when the order in which the said rods are reciprocated is reversed.

2. In an automatic telegraph transmitter controlled by signal holes in a perforated tape passing through it, the combination of two pecker rods adapted respectively to engage in upper and lower signal holes in the perforated tape, means for reciprocating the rods alternately, means for reversing at predetermined intervals the order in which the two rods are reciprocated, means for stepping back the tape during each reversal to cause a repetition of signals corresponding to the signal holes on the part of the tape immediately preceding the point at which reversal takes place, a source of marking and spacing electric current, a transmitting relay associated with said source and so controlled by the pecker rods that it transmits a marking current when one pecker rod engages in a signal hole and a spacing current when the other pecker rod engages in a signal hole, and means whereby the pecker rods which respectively control the marking and spacing current transmissions of the relay are reversed when the order in which the said rods are reciprocated is reversed.

3. An automatic telegraph transmitter of the perforated tape type comprising in combination a perforated tape having upper and lower signal holes corresponding to a message to be transmitted, means for advancing the tape step by step, two pecker rods adapted respectively to engage in the upper and lower signal holes in the tape, mechanism for reciprocating the rods alternately between each movement of the tape, means for reversing the order in which the two rods are reciprocated, a relay device controlling said reversing means, a source of marking and spacing electric current, a transmitting relay associated with said source and so controlled by the pecker rods that it transmits a marking current when one rod passes through a signal hole and a spacing current when the other rod passes through a signal hole, and means whereby the pecker rods which respectively control the marking and spacing current transmissions of the transmitting relay are reversed when said relay device is actuated.

4. An automatic telegraph transmitter of the perforated tape type comprising in combination a perforated tape having upper and lower signal holes corresponding to a message to be transmitted, normally operative means for advancing the tape step by step, normally inoperative means for stepping back the tape, two pecker rods adapted respectively to engage in the upper and lower signal holes in the tape, mechanism for reciprocating the rods alternately between each movement of the tape, means for reversing the order in which the two rods are reciprocated, a relay device controlling said reversing means, a source of marking and spacing current, a transmitting relay associated with said source and so controlled by the pecker rods that it transmits a marking current when one rod passes through a signal hole and a spacing current when the other rod passes through a signal hole, means whereby the pecker rods which respectively control the marking and spacing current transmissions of the transmitting relay are reversed when said relay devices is actuated, means for operating the relay device at predetermined intervals and means whereby the tape advancing means is rendered inoperative and the tape stepping back means is rendered operative during the operation of the said relay device.

5. In a translator for use in a secret automatic telegraph system and controlled by signal holes in a perforated tape, the combination of pecker rods and selector rods adapted to engage in signal holes, means for reciprocating said rods, a translating relay controlled by said rods and control means whereby the operation of the translating relay by the selector rods effects the interpolation of missing signals.

6. In a translator for use in a secret automatic telegraph system and controlled by signal holes in a perforated tape, the combination of pecker rods and selector rods adapted to engage in adjacent holes in the tape, means for reciprocating the pecker rods and selector rods simultaneously, a translating relay, a source of marking and spacing current associated with said relay, means whereby the engagement of the pecker rods and selector rods in appropriate signal holes during their simultaneous reciprocation controls the translating relay so that it transmits a marking current, a spacing device, means for operating the spacing device after the simultaneous reciprocation of the pecker and selector rods, means for reciprocating the selector rods simultaneously with the spacing device, means whereby the spacing device controls the translating relay so that it transmits a spacing current and means for rendering the operation of the spacing device ineffective when a selector rod, reciprocated during such operation, engages in an appropriate signal hole.

7. In a translator for use in a secret automatic telegraph system and controlled by signal holes in a perforated tape, the combination of pecker rods and selector rods adapted to engage in adjacent holes in the tape, means for reciprocating the pecker rods and selector rods simultaneously, a translating relay, a source of marking and spacing current associated with said relay, means whereby the engagement of the pecker rods and selector rods in appropriate signal holes during their simultaneous reciprocation controls the translating relay so that it transmits a marking current, a spacing device, means for operating the spacing device after the simultaneous reciprocation of the pecker and selector rods, means for reciprocating the selector rods simultaneously with the spacing device, means whereby the spacing device controls the translating relay so that it transmits a spacing current, means for rendering the operation of the spacing device ineffective when a selector rod, reciprocated during such operation, engages in an appropriate signal hole, and a switching device for reversing the control of the translating relay by the pecker and selector rods.

8. In a translator for use in a secret automatic telegraph system and controlled by signal holes in a perforated tape the combination of means for advancing the tape step by step, pecker rods and selector rods adapted to engage in adjacent holes in the tape, means for reciprocating the pecker rods and selector rods simultaneously, a translating relay, a source of marking and spacing current associated with said relay, means whereby the engagement of the pecker rods and selector rods in appropriate signal holes during their simultaneous reciprocation controls the translating relay so that it transmits a marking current, a spacing device, means for operating the spacing device after the simultaneous reciprocation of the pecker and selector rods, means for reciprocating the selector rods simultaneously with the spacing device, means whereby the spacing device controls the translating relay so that it transmits a spacing current, means for rendering the operation of the spacing device ineffective when a selector rod, reciprocated during such operation, engages in an appropriate signal hole, a switching device for reversing the control of the translating relay by the pecker and selector rods and means operative during the actuation of said switching device for advancing the tape a predetermined number of steps.

9. In an automatic telegraph transmitter controlled by signal holes in a perforated tape passing through it, the combination of means for advancing the tape step-by-step through the transmitter, means for engaging successively the signal holes in the tape at each step, control means whereby said engaging means causes the transmission of impulses in accordance with such signal holes, means operated at predetermined intervals for reversing the order in which the signal holes are engaged at each step, and means for stepping-back the tape during each reversal to cause a repetition of signals corresponding to the signal holes on the part of the tape immediately preceding the point at which the reversal takes place.

10. In a translator for use in a secret automatic telegraph system and controlled by signal holes in a perforated tape, the combination of means for advancing the tape step-by-step, means for engaging the signal holes in the tape, a translating relay controlled by said engaging means, a switching device for reversing the control of the translating relay by the engaging means, and means operative during the actuation of said switching device for advancing the tape a predetermined number of steps.

In testimony whereof I have signed my name to this specification.

JAMES HENRY SMART.